(No Model.) 3 Sheets—Sheet 1.
F. B. JOHNSON, W. P. HALL, W. OAKLEY & C. F. CURREY.
PROCESS OF AND APPARATUS FOR THE MANUFACTURE OF GAS.
No. 520,401. Patented May 22, 1894.
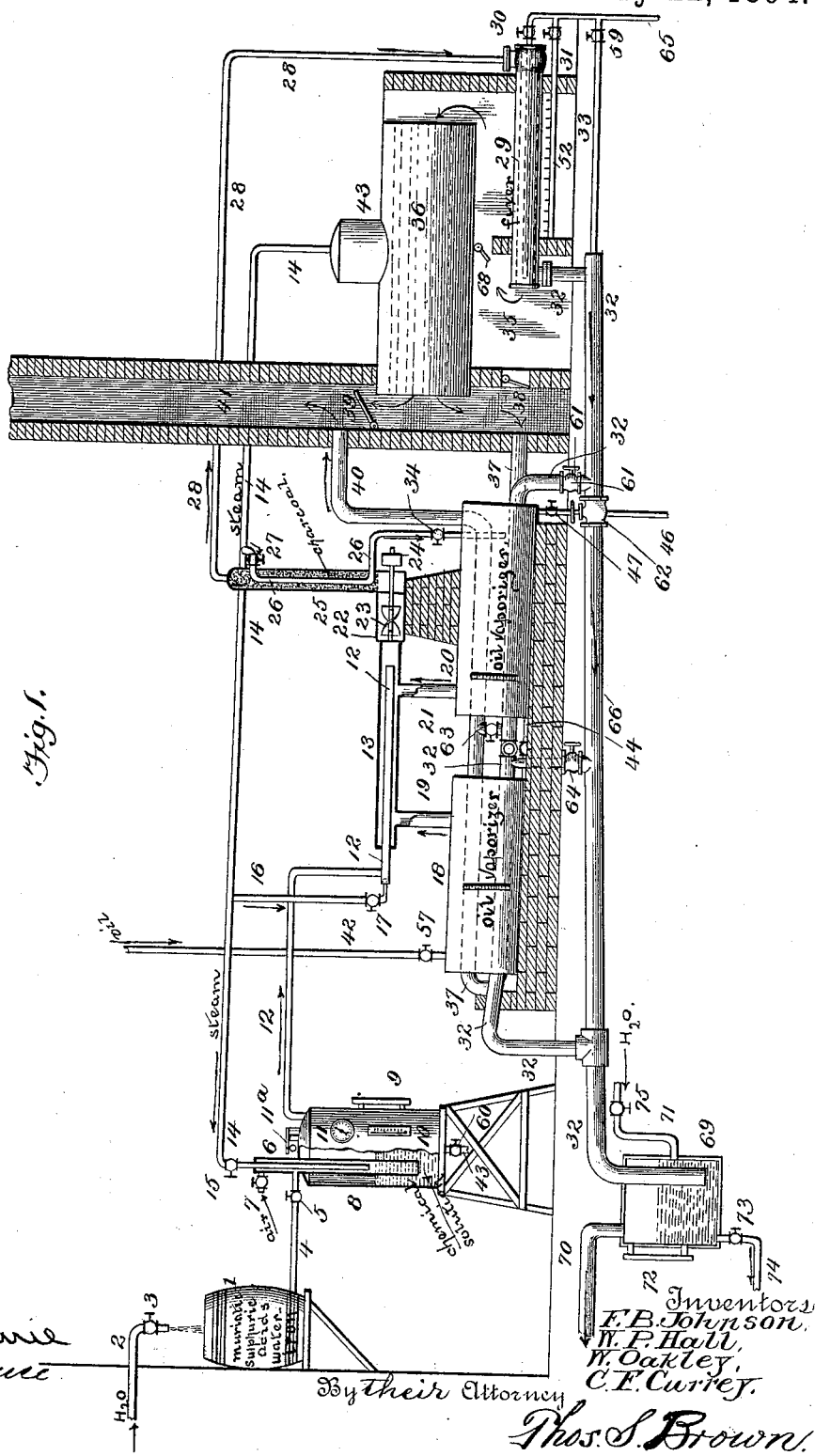

(No Model.) 3 Sheets—Sheet 2.
F. B. JOHNSON, W. P. HALL, W. OAKLEY & C. F. CURREY.
PROCESS OF AND APPARATUS FOR THE MANUFACTURE OF GAS.
No. 520,401. Patented May 22, 1894.
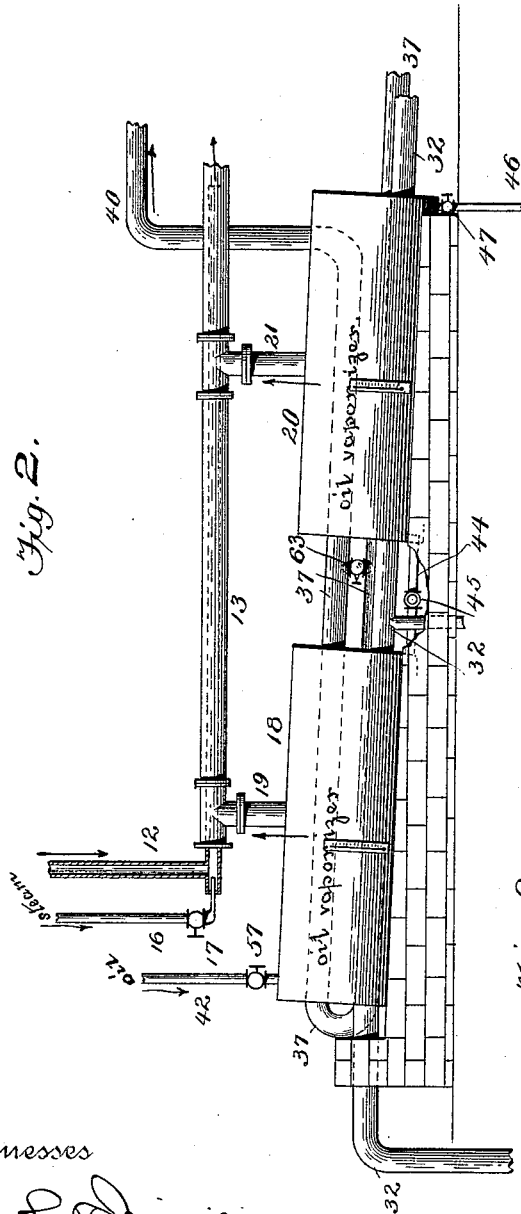
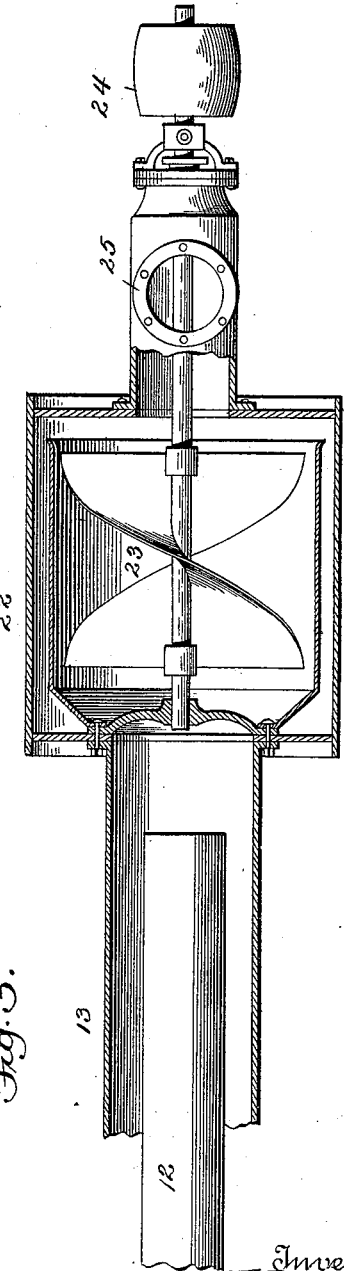

(No Model.) 3 Sheets—Sheet 3.
F. B. JOHNSON, W. P. HALL, W. OAKLEY & C. F. CURREY
PROCESS OF AND APPARATUS FOR THE MANUFACTURE OF GAS.
No. 520,401. Patented May 22, 1894.
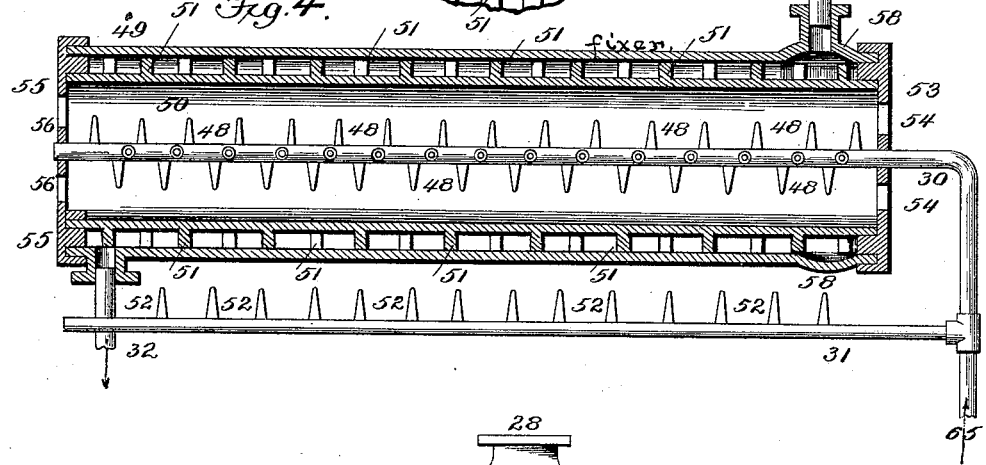
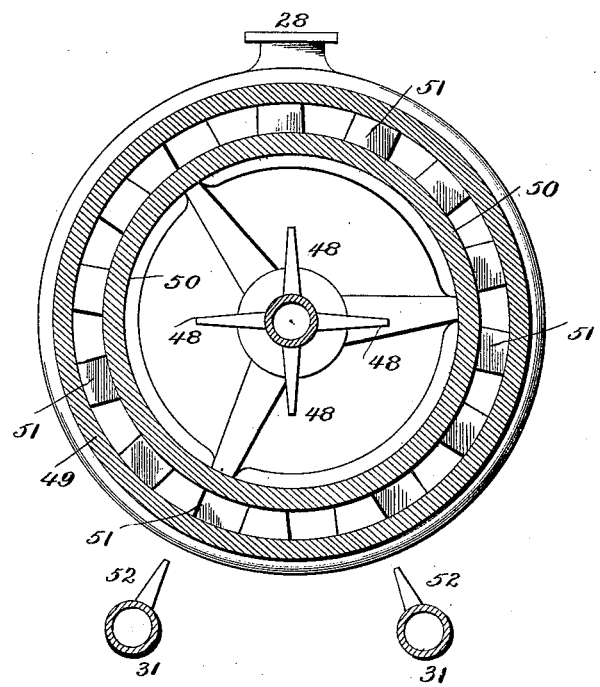

UNITED STATES PATENT OFFICE.

FRANK BURLEIGH JOHNSON, WILLARD P. HALL, WALTER OAKLEY, AND CHARLES FREMONT CURREY, OF TOPEKA, KANSAS, ASSIGNORS TO THE JOHNSON SYNDICATE CONSTRUCTION COMPANY, OF SAME PLACE.

PROCESS OF AND APPARATUS FOR THE MANUFACTURE OF GAS.

SPECIFICATION forming part of Letters Patent No. 520,401, dated May 22, 1894.

Application filed May 27, 1892. Serial No. 434,650. (No model.)

*To all whom it may concern:*

Be it known that we, FRANK BURLEIGH JOHNSON, WILLARD P. HALL, WALTER OAKLEY, and CHARLES FREMONT CURREY, citizens of the United States, residing at Topeka, in the county of Shawnee, in the State of Kansas, have invented a certain new and useful Process of and Apparatus for the Manufacture of Gas, of which the following is a specification.

Our invention relates to an improved process of producing and apparatus for the manufacture of fuel and illuminating gas from atmospheric air, steam, water impregnated with chemical solution to release its hydrogen, and vapor of carbon oil, mixing and combining these elements, purifying the gas thus formed by friction and attrition in a purifying chamber containing charcoal, slag or other attritious material, and fixing it by passing it through heated fixing chambers or converters of peculiar construction, forming a permanent, fixed, non-condensible gas.

The objects of our invention are, first, to provide a process for producing oxy-hydrogen vapor under pressure; second, to provide a process for producing carbon oil vapor; third, to provide a process of intimately mixing and combining and purifying the oxy-hydrogen vapor and the carbon oil vapor before it enters the fixing chamber; fourth, to provide a process of converting and fixing the oxy-hydrogen vapor and carbon oil vapor into a permanent, fixed gas, absolutely pure and non-condensable; fifth, to provide a process of manufacturing cheaply from atmospheric air, water, steam, and carbon oil vapor a fuel and illuminating gas of any desired candle power and heat units; sixth, an apparatus for producing oxy-hydrogen vapor under pressure; seventh, to provide an apparatus for producing carbon oil vapor; eighth, to provide an apparatus for intimately mixing and combining and purifying the oxy-hydrogen vapor and the carbon oil vapor before it enters the fixing chamber or converter; ninth, to provide an apparatus for converting and fixing the oxy-hydrogen vapor and carbon oil vapor into a permanent, fixed gas, absolutely pure and non-condensable; tenth, to provide an apparatus cheaply to manufacture from atmospheric air, water, steam, and carbon oil vapor a fuel and illuminating gas of any desired number of heat units and candle power. We attain these objects by means of the apparatus illustrated in the accompanying drawings, in which the same figures refer to the same parts through the several views.

Figure 1 is a vertical projection of the entire apparatus. Fig. 2 shows the oil chambers or evaporators and pipes connected therewith. Fig. 3 shows the mixing chamber and fan therein. Fig. 4 shows the converter or fixing chamber and pipes for heating same, and for conveying vapor to and gas from same. Fig. 5 shows the disposition of the lugs on the outer perimeter of the inner chamber. Fig. 6 shows an end view of converter or mixing chamber with the head removed.

1 is a reservoir containing the chemical solution used in the process, which consists of a diluted solution of muriatic acid and sulphuric acid in about the proportions of one pound of muriatic acid and one half pound of sulphuric acid to one to three barrels of water. These proportions may be varied but are substantially the best. It is supplied with water through the pipe 2, the flow of water being regulated by the stopcock 3.

4 is a pipe conveying chemical solution to and into feed or air pipe 6 whence it finds its way into the pressure generator the amount passing into the same being regulated by stopcock 5.

6 is an air and feed pipe entering generator and passing below the water line therein, the influx of air being regulated by stopcock 7.

8 is the liberator and pressure generator, in which is placed about one pound of iron filings to every barrel of solution introduced from the chemical reservoir. It is provided with the water gage 9, thermometer 10 and pressure gage 11. The steam pipe 14 from the steam box 43 also passes into the generator within the air pipe 6, stopping immediately above the water line.

15 is a stop-cock in steam pipe to regulate the pressure, and the amount of steam introduced into the pressure generator.

12 is a pipe carrying the oxy-hydrogen vapor from the generator into the conveyer 13 passing nearly the whole length of the same and to within a short distance of the mixing chamber.

16 is a steam pipe entering the oxy-hydrogen vapor pipe before it passes into the conveyer and having the stop-cock 17 to regulate the amount of steam introduced.

18 and 20 are oil chambers or evaporators connected by the pipes 19 and 21 with the conveyer 13. The evaporators are set one a little higher than the other, and each at a slight inclination as shown more clearly in Fig. 2. Oil is conveyed into the higher evaporator through the oil pipe 42, the amount being regulated by the stop-cock 57. The lower evaporator is supplied from the upper through the pipe 44 having the stop-cock 45, and the heavy residuum of evaporation is carried off through the pipe 46 closed by the stop-cock 47.

22 is the mixing chamber in which is operated the fan 23 driven at a high rate of speed by power applied through the pulley 24, or by such other means as may be desired.

25 is the purifier containing charcoal, slag or other purifying medium and having within it the steam pipe 26 provided with stop-cock 27.

28 is the pipe conveying the mixed carbon oil vapor and oxy-hydrogen vapor from the purifying chamber to the converter or fixing chamber 29. The converter or fixing chamber 29 consists (Figs. 4, 5 and 6) of an outer chamber 49 and an inner chamber 50. The inner chamber is provided on its outer perimeter with lugs 51 arranged as shown in Fig. 5. The lugs impinge upon the inner perimeter of the outer chamber. The inner chamber is heated to a high temperature by flames through the jets 48 fed by the pipe 30 passing through the center of the chamber. The outer chamber is heated also to a high temperature by flames through the jets 52 fed by the pipe 31, the pipes 30 and 31 being supplied from the supply pipe 65 or by other suitable means. The outer chamber has at the point where the pipe 28 enters it, the enlargement or bulge, which is carried around the entire circumference, Fig. 4, 58.

32 is a pipe carrying the fixed gas from the fixing chamber to the gas holder, passing through the carbon oil chambers or evaporators on its way, it is provided with the valve 61 which being closed and valve 62 opened the gas passes through the pipe 66 to the holder. It is also provided with suitable valves and pipe 64 between the successive evaporators by which the gas is shut off from the succeeding evaporator and carried into pipe 66, and thence to holder.

35 is the furnace in which the converter or fixing chamber is set. In it is also set the tubular boiler 36 having the steam box 43. The ends of the fixing chamber are closed by the heads 53, 55 having the air draft openings 54, 56.

37 is a pipe carrying hot air from the furnace through the oil evaporators furnishing heat for evaporation. Said pipe after passing through the evaporators returns outside the same and at 40, passes into the open air flue 41. It is also provided between the successive evaporators with cut-off valves 63 and pipes connecting with the return pipe by which the heat is cut off from the succeeding evaporator and carried into the return pipe.

38, 39 and 68 are dampers for regulating and directing the heat of the furnace.

69 is a gas cooler and safety tank, the gas from the furnace is carried into it through the pipe 32 extending below the surface of the water, and is carried away by the pipe 70 set in above the water line, the tank is kept constantly supplied with cold water by the supply pipe 71, and the warm water carried out by the pipe 74, the water is maintained at a uniform height in the tank by regulating the stop-cocks in 73, and 75 in the supply and exit pipes.

In the manufacture of fuel and illuminating gas by our process and with our apparatus the operation is as follows: The furnace 35 is heated by gas or other material through the pipes 30 and 31 and jets 52 and 48. Gas for the initial heating is drawn from the gas holder through the supply pipe 65, the check valve 59 preventing its flow into the fixing chamber. Other material than gas may be used for the initial heating or at any stage of the production. After the apparatus is in operation and gas formed the jets are supplied by the pipe 33 connecting with pipe 32 bearing the hot gas from the converter to the gas holder. The furnace being heated steam is generated in the steam boiler 36. The steam thus generated is carried through the pipe 14 to and into the liberator and pressure generator 8 which it enters through the air pipe 6 which is larger than itself and closed at its outer end. The generator 8 is partly filled with a chemical solution until the mouth of the air pipe is submerged the mouth of the steam pipe not being under the liquid. The depth of the liquid is observed on the water gage 9 attached to the generator. The pressure of the steam in the steam boiler causes the steam to escape in a steam jet from the mouth of the steam pipe, and the pressure in the generator is observed upon the pressure gage 11. The escape of the steam jet inclosed within the air pipe 6 causes a vacuum therein above the mouth of the steam pipe and this in turn produces an inflow of atmospheric air upon opening the stop-cock 7, and the pressure and flow of the steam into the generator is regulated by the stop-cock 15. The temperature of the generator is observed upon the thermometer 10. When the desired temperature and pressure are obtained in the generator, the chemical solution is introduced from the chemical reservoir 1 through the pipe 4, the flow being regulated by the stop-cock 5. By the action of the chemical solution in the presence of the iron filings and the heat and pressure generated by the steam introduced hydrogen is generated and the air, steam and hydrogen are carried by the pressure in the generator through the pipe 12, while the byproduct of the decomposition is drawn off through the pipe 43 having the stop-cock 60. The air, steam and hydrogen are carried by the pipe 12 into the conveyer 13 and emptied therein at a point beyond the entrance of the pipes 19 and 21 carrying the oil vapor. To raise and maintain the temperature throughout the conveyer and prevent condensation a current of steam is carried into the pipe 12 by the steam pipe 16, exterior to its entrance into the conveyer. The steam pipe 16 has the stop-cock 17 by which the flow of steam and the temperature of the conveyer are regulated. The heat from the furnace having passed through the boiler, by closing the damper 39, is directed to and passes into and through the pipe 37 which passes through the oil chambers or evaporators. The evaporators, one or more or any number being used according to the size of the plant and result desired. The evaporators being partly filled with carbon oil the heat from the pipe 37 causes evaporation and the carbon oil vapor thus produced passes partly by pressure, partly by motion in the conveyer, into the conveyer. When two or more evaporators are used, each successive evaporator is set a little higher than the preceding the lowest being next to the furnace and the highest the farthest therefrom. By the cut-off valve in the pipe 37 and the pipe connecting it with the return pipe of the heater the temperature of the higher or highest evaporator is regulated and maintained at a point sufficient only to carry off the hydrogen and lighter and more volatile vapors of the carbon oil. The residue is carried by the pipe connecting the highest evaporator with the one next lower, in which by a like arrangement of cut-off valve and pipe to return pipe of heater the temperature is regulated to carry off the next heavier vapors of the carbon oil, and so on down the series the heat increasing as the furnace is approached, and the residue carried down becomes heavier until from the last the heavy residue of the lubricating oil is drawn off. The carbon oil vapors carried from the evaporators into the conveyer there come in contact with and unite with the air, hydrogen and steam therein, and they together pass into the mixing chamber 22, where by the action of the fan therein they become and are thoroughly and intimately mixed. A screw-shaped fan is preferably used in the mixing chamber, though any form of fan may be used. From the mixing chamber the gases and vapors there intimately mixed pass into the purifier 25 containing charcoal, slag or other purifying and attritious material, where the sulphur and all other impurities are removed, leaving the mixture of air, hydrogen, steam and carbon oil vapor in a perfectly and absolutely pure state and thoroughly mixed. The purifier has within it the steam pipe 26 the purpose of which is to retain the purifier at such temperature that condensation will not take place. The steam pipe 26 after leaving the purifier is carried into and through the oil evaporators and assists in producing evaporation of the carbon oil, or by the stop-cock and escape valve 34 the steam therefrom may be released. From the purifier the air, hydrogen, steam and carbon oil vapor mixed and purified are carried through the pipe 28 to and into the converter or fixing chamber, between the outer and inner chambers, where by reason of the bulge 58 on the outer chamber, it is carried uniformly round the inner chamber, and is then carried forward between the chambers and by reason of the peculiar alternate arrangement of the lugs on the inner chamber they are thoroughly mixed, remixed, broken up and distributed, such distribution being obtained that every separate particle or molecule is brought directly in contact with the heated surface of the inner or outer chamber or the lugs many times during the passage. The inner chamber and the lugs are maintained at a high temperature by means of the jets 48 fed by the pipe 30, and the outer chamber is maintained at like high temperature by means of jets 52 disposed around it two or more, fed by pipes 31. By the high temperature and the perfect distribution obtained, the gases and vapors are thoroughly mixed and combined and an absolutely pure and non-condensable gas is formed and is carried off through the pipe 32. The pipe 32 passes through the oil chambers or evaporators, and valve 62 being closed and valve 61 opened the heated gas from the fixing chamber passes through the evaporators and assists in evaporation, if the heat from the gas be not necessary to the evaporation, closing valve 61 and opening valve 62 the gas is carried through the pipe 66 immediately to the cooler. Between the successive evaporators the pipe 32 is provided with valves and pipes 64 to deflect the hot gas into the pipe 66 and regulate the temperature of the successive evaporators as explained above in reference to the heating pipe 37. The gas before reaching the gas holder is passed through the cooler 69. This also acts as a safety valve, any explosion or fire in the holder not being able to reach the producer, and vice versa. After the initial heating of the furnace, fuel for maintaining the heat is supplied in the fixing chamber by hot gas passing through the supply pipe 33 from the pipe 32, connecting with the pipes 30 and 31.

By our process a larger amount of free hydrogen is generated from the solution than by any other process.

By our process of evaporating the carbon oil a more complete evaporation of the oil is obtained and the carbon oil vapors brought in contact with the oxy-hydrogen vapors and more thoroughly mixed therewith, and the mixed vapors more thoroughly and perfectly purified from sulphur and other noxious impurities than any other known process.

By our process and apparatus, by the even and minute distribution of the mixed vapors in the fixing chamber the same are brought more intimately in contact with the heated surface, and a more complete and enduring fixing of the gas is obtained than by any other known process and apparatus, the resulting product being an absolutely pure and non-condensable gas.

Having thus described our invention, what we claim, and desire to secure by Letters Patent, is—

1. The process of manufacturing fuel and illuminating gas, which consists, in passing steam and air into a receiver containing a chemical solution and iron filings, obtaining thereby water vapor, hot air and hydrogen gas, passing the water vapor, hot air and hydrogen from the receiver into a chamber called a conveyer, adding in their passage an increment of steam sufficient to prevent condensation, evaporating carbon oil in such manner that simultaneously the more volatile carbon products are vaporized at a certain degree of heat and the less volatile carbon products are vaporized at a higher degree of heat, collecting the several carbon oil vapors and uniting and intimately mixing them with each other and with the water vapor, air and gas passing from the receiver to form a gas uniform in composition, purifying the mixture and by heat disintegrating and decomposing the individual vapors and recombining them into a single, uniform fixed gas, substantially as shown and described.

2. In an apparatus for the manufacture of fuel, and illuminating gas the combination of the receiver 8 containing chemical solution and iron filings and having steam, air and liquid inlets, the residuum outlet and the indicating instruments, the pipe 13 having within it the pipe 12 from the receiver 8, the steam pipe 16 entering the pipe 12, the carbon vapor generators connected with the pipe 13, a mixing chamber into which said pipe 13 empties, a mixer in the mixing chamber, a purifier containing a steam coil and purifying material into which the vapors and gases pass from the mixing chamber, a furnace, a steam boiler and fixing chamber in the furnace, pipes provided with burners for heating the outer and inner walls of the fixing chamber, a pipe between the purifier and the fixing chamber, a pipe between the steam boiler and the receiver 8, a pipe between the fixing chamber and a collector, a pipe from the furnace flue passing through the carbon vapor generators and connecting with a return pipe outside the generators entering the flue of the furnace, a cut off between the carbon vapor generators connecting said heating pipe with the return pipe, a pipe from the fixing chamber passing through the carbon vapor generators, a cut off between the carbon vapor generators connecting the pipe from the fixing chamber through the generators with the pipe from fixing chamber to the collector, and dampers in the furnace and in the furnace flue all substantially as shown and described and for the purposes specified.

3. In an apparatus for the manufacture of fuel and illuminating gas, a furnace constructed with a front, a rear and an intermediate wall, a furnace flue connected with the furnace contiguous to the rear wall thereof, a steam boiler set in the furnace, under the boiler a gas fixing chamber consisting of an inner and outer concentric pipe or hollow cylinder forming an annular chamber alternately disposed upon the outer perimeter of the inner cylinder and impinging upon the inner surface of the outer cylinder, heads to the cylinders closing said annular chambers, ingress and egress pipes connected therewith, pipes provided with burners disposed about the outer cylinder for heating the same, a pipe provided with burners passing through the cylinders longitudinally for heating the inner cylinder, a pipe entering the flue near its base, carbon vapor generators through which said pipe passes, a damper in the rear wall of the furnace for directing the heat through the boiler, a damper in the intermediate wall of the furnace to cut off the heat from the boiler and direct it into the flue, and a damper in the flue to direct the heat into the pipe entering the flue near its base, substantially as shown and described and for the purposes specified.

4. In an apparatus for the manufacture of fuel, and illuminating gas, carbon oil chambers or evaporators successively arranged in an ascending order, each connected by pipe with the one next lower, the highest in the series being provided with an inlet pipe for filling the same and the lowest in the series being provided with a discharge pipe for drawing off the residuum of evaporation, a furnace, a furnace flue contiguous to the furnace, a fixing chamber within the furnace, a pipe passing from the furnace flue through the evaporators and connecting with a return pipe passing outside the evaporators back into the flue of the furnace, a cut-off between the evaporators connecting said heating pipe with the return pipe, a pipe passing from the fixing chamber in the furnace through the evaporators and provided with a cut-off between the evaporators connecting said pipe with the pipe passing directly from the fixing chamber to the gas collector, providing means by which the carbon oil in the successive evaporators are subjected simultaneously to different degrees of heat and the lighter products and the heavier products simultaneously evaporated, a receiver containing a chemical solution and iron filings, and having steam, air and liquid inlets, residuum outlet, and indicating instruments, a pipe 13 having within it the pipe 12 from the receiver, steam pipe 16 entering the pipe 12, said pipe 13 being connected with each of the evaporators and wherein the several carbon oil vapors are collected and united with each other and with the water-vapor air and gases forming a continually uniform gas before entering the fixing chamber, substantially as shown and described and for the purposes specified.

5. In an apparatus for the manufacture of fuel and illuminating gas, a fixing chamber consisting of an inner and outer concentric pipe or hollow cylinder forming an annular chamber, heads to the cylinders closing the chamber and provided with air openings into the inner cylinder, lugs alternately disposed upon the outer perimeter of the inner cylinder impinging upon the inner surface of the outer cylinder in such order that the lugs of any series shall stand opposite the openings between the lugs of the preceding series, an inlet opening into the chamber and an outlet opening from the chamber through the outer cylinder at the opposite ends thereof, pipes provided with burners disposed about the outer cylinder for heating the same, and a pipe provided with burners passing centrally through the inner cylinder for heating the same, substantially as shown and described and for the purposes specified.

6. The combination of a pressure chamber containing chemical solution, an air pipe extending down through the chamber into the solution, a steam pipe extending into the air pipe above the solution, a conveyer, a conveyer-pipe, a vapor-pipe connecting the pressure chamber with the conveyer-pipe, a steam pipe connected with the vapor-pipe, hydrocarbon oil-chambers, pipes connecting the hydrocarbon oil-chambers with the conveyer, a mixing chamber with which the conveyer is connected, the purifier connected with the mixing chamber, the fixing chamber, the pipe connecting the purifier with the fixing chamber, a discharge pipe, means for heating the hydro-carbon chamber, means for heating the purifier, and means for heating the fixing-chamber, substantially as described.

FRANK BURLEIGH JOHNSON.
WILLARD P. HALL.
WALTER OAKLEY.
C. FREMONT CURREY.

Witnesses:
J. T. SWEEZEY,
JOHN B. McGUIRE,
A. M. ELLIOTT.